US007271759B1

(12) United States Patent
Bofinger et al.

(10) Patent No.: US 7,271,759 B1
(45) Date of Patent: Sep. 18, 2007

(54) APPARATUS FOR CAMOUFLAGING SPECULAR REFLECTING COVER SURFACES

(75) Inventors: Ralph Bofinger, Karisruhe (DE); Alexander Hoffmann, Rauenburg (DE)

(73) Assignee: EADS Deutschland GmbH, Ottobrunn (DE)

( * ) Notice: Subject to any disclaimer, the term of this patent is extended or adjusted under 35 U.S.C. 154(b) by 73 days.

(21) Appl. No.: 11/137,417

(22) Filed: May 26, 2005

(30) Foreign Application Priority Data

May 26, 2004 (DE) ...................... 10 2004 025 647

(51) Int. Cl.
*H01Q 17/00* (2006.01)
*B32B 7/02* (2006.01)

(52) U.S. Cl. .......................... 342/3; 428/212; 359/883

(58) Field of Classification Search ................ 428/212
See application file for complete search history.

(56) References Cited

U.S. PATENT DOCUMENTS

| | | | | |
|---|---|---|---|---|
| 3,568,195 | A * | 3/1971 | Wesch et al. | 342/1 |
| 4,319,332 | A * | 3/1982 | Mehnert | 342/27 |
| 4,640,851 | A * | 2/1987 | Pusch | 428/17 |
| 4,743,478 | A * | 5/1988 | Pusch | 428/17 |
| 4,781,959 | A * | 11/1988 | Gottlieb | 428/95 |
| 4,839,661 | A * | 6/1989 | Losee | 343/719 |
| 5,077,556 | A * | 12/1991 | Aisslinger | 342/3 |
| 5,220,462 | A * | 6/1993 | Feldman, Jr. | 359/855 |
| 5,304,789 | A * | 4/1994 | Lob et al. | 235/487 |
| 5,830,529 | A * | 11/1998 | Ross | 427/152 |
| 6,057,799 | A * | 5/2000 | Martin-Neira et al. | 342/351 |
| 6,127,007 | A * | 10/2000 | Cox et al. | 428/15 |
| 6,292,156 | B1 * | 9/2001 | Openlander | 343/895 |
| 6,613,420 | B1 | 9/2003 | Leupolz et al. | |
| 6,655,102 | B1 * | 12/2003 | LaRue | 52/311.1 |
| 6,753,075 | B1 * | 6/2004 | Leupolz et al. | 428/323 |
| 2004/0134138 | A1 * | 7/2004 | LaRue | 52/169.1 |
| 2006/0046159 | A1 * | 3/2006 | Emslander et al. | 430/5 |
| 2006/0254702 | A1 * | 11/2006 | Emslander et al. | 156/244.11 |

FOREIGN PATENT DOCUMENTS

| | | |
|---|---|---|
| DE | 197 10 692 C2 | 9/1998 |
| DE | 199 55 608 C2 | 6/2001 |

* cited by examiner

*Primary Examiner*—Thomas H. Tarcza
*Assistant Examiner*—Hien Ly
(74) *Attorney, Agent, or Firm*—Crowell & Moring LLP

(57) ABSTRACT

A camouflage device for camouflaging specularly reflecting surfaces of an object is formed with function elements for influencing the reflection of radiation from an assumed radiation source. Each function element forms a part of an outer layer and has a pair of individual surfaces on its side facing the radiation source. The individual surfaces extend longitudinally side-by-side, and their surfaces are arranged at an angle to one another. The camouflaging device is arrangeable on the object by means of a mechanism such that it is disposed in front of the reflecting surface; and the angular arrangement of the respectively assigned individual surfaces extends such that the surface normal of a first individual surface is sloped downward, and the surface normal of a second individual surface points more steeply than 80° to the horizontal plane, and their surface courses form an angle of <90° with respect to one another.

11 Claims, 1 Drawing Sheet

APPARATUS FOR CAMOUFLAGING SPECULAR REFLECTING COVER SURFACES

The invention relates to a device for camouflaging specularly reflecting surfaces.

BACKGROUND OF THE INVENTION

In the field of long-range radar systems, so-called "phased-array antennas" are part of the state of the art. A special characteristic of these antennas is a plane exterior surface in the viewing direction of the antenna array. Because the viewing angle of this antenna arrangement is azimuthally considerably restricted but a 360° view is required for an operative marine application, this antenna system is periodically rotated about its vertical axis. For an optimal detection of the elevation (total angle of the upper half-space=90°), a basic alignment of the array surface in the range of 45°with respect to the horizontal plane is required in this case.

Based on this background, a problem is detected which occurs in the spectral range of between 0.4 μm-5.0 μm (VIS, NIR, SWIR and MWIR). The plane surface, which forms the outer end of the antenna in the transmitting and receiving direction and which, in the case of an implemented typical antenna, has a surface of 21*n* m2, represents a considerable reflector for the sun. It is another difficulty that, because of the basic alignment as well as the continuous rotation, the angular condition for specular reflections is met for a wide range of the solar altitude angle as well as of the observer's angle with respect to the sun. A flashing sun reflex of a signal duration of typically approximately 0.3-0.7 s can be observed, which is easily detected by an imaging sensor in the entire spectral range of the solar radiation (VIS, NIR, SWIR and MWIR) and can unfortunately also be classified because of the conceivable low piece numbers of the installed antennas.

In this case, a specular degree of reflection of a few percent will be sufficient for increasing the reflected intensity far above the ambient brightness. For the purpose of a comparison: Depending on the amount of dirt and the orientation, an uncoated plane glass pane reflects 5 to 8% of the incident intensity and, depending on the size, supplies a conspicuous signal over a distance of 20 km for imaging sensors.

The following applies to a typical antenna: Up to an observer's distance of 0.5 km, the width of the antenna fills the entire angular dimension of the sun; at a distance of 10 km still 5% or barely 1 mrad; that is, for most imaging sensors, more than one pixel width. A geometrical "dilution" occurs only at a multiple of this distance; that is, as a rule far behind the horizon. The decisive factor in this case is the large dimension of the almost perfectly plane face of the antenna. A reduction of the spectral degree of reflection (black color) for suppressing the specular reflex would have to be changed to far below 0.5%, which can virtually not be achieved according to the generally known state of the art.

Wide-spread technology would suggest the use of a dull lusterless color. In this case, normally microscopic structures (area 10 μmØ) in the form of pigments or cavities are placed in the surface. However, this is always connected with a high susceptibility to contamination, particularly by means of drops of water. In the surroundings of a battleship, particularly in the proximity of the diesel exhaust gas system, this is very unfavorable; that is, it cannot be maintained for extended time periods because the surfaces have to be cleaned frequently (for example, twice a week), and in this case would lose their dull characteristic just as a result of material ablation.

Furthermore, camouflaging elements are known from German Patent Documents DE 199 55 608 C2 and DE 197 10 692 C2.

SUMMARY OF THE INVENTION

It is an object of the invention to achieve a lasting effective suppression of the specular reflection by means of simple devices.

This object is achieved by the camouflaging device according to the invention is provided for camouflaging specularly reflecting surfaces of an object, which has function elements for influencing the reflection of an assumed radiation source. Each function element, as part of an outer layer, has a pair of individual surfaces on its side facing the radiation source, which individual surfaces extend side-by-side in the longitudinal direction, with their surfaces arranged at an angle to one another. The camouflaging device can be arranged on the object by means of a mechanism such that, with respect to the assumed position of a radiation source, the camouflaging device is arranged in front of the reflecting surface and the angular arrangement of the respectively assigned individual surfaces extends such that the surface normal of a first individual surface 21 is sloped downward, and the surface normal of a second individual surface 22 points steeper than 80° to the horizontal plane, and their surface courses form an angle of <90° with respect to one another.

In the case of the camouflaging device, the actual width of the individual surfaces may be between 2 and 5 mm.

When the camouflaging device is used for camouflaging an antenna, the rearward side of the outer layer facing the antenna may have a pair of individual surfaces which extend side-by-side in their longitudinal direction and whose surfaces are arranged at an angle with respect to one another in order to at least partially compensate distortions of the antenna radiation because of the structuring of the outer side of the outer layer.

Furthermore, a camouflaging device is suggested for camouflaging specularly reflecting surfaces of an object to be camouflaged having function elements for influencing the reflection of an assumed radiation source, each function element having, as part of an outer layer, on its side facing the radiation source, valleys and elevations with differences of height of between 2 and 4 mm, the width of the valleys being one to two times larger than the depth of the valleys, in which case the camouflaging device can be arranged on the object by means of a mechanism such that the longitudinal direction of the valleys and elevations extends in a horizontal plane while the fluctuation width is ±10°.

According to the invention, the problem is solved, not as in the prior art by the reduction of the degree of reflection, but by eliminating the specularity.

For this purpose, the solution according to the invention provides a macroscopic breaking-open of the surface by structures in the range of ≧1 mm.

Other objects, advantages and novel features of the present invention will become apparent from the following detailed description of the invention when considered in conjunction with the accompanying drawings.

DETAILED DESCRIPTION OF THE INVENTION

Figure 1:
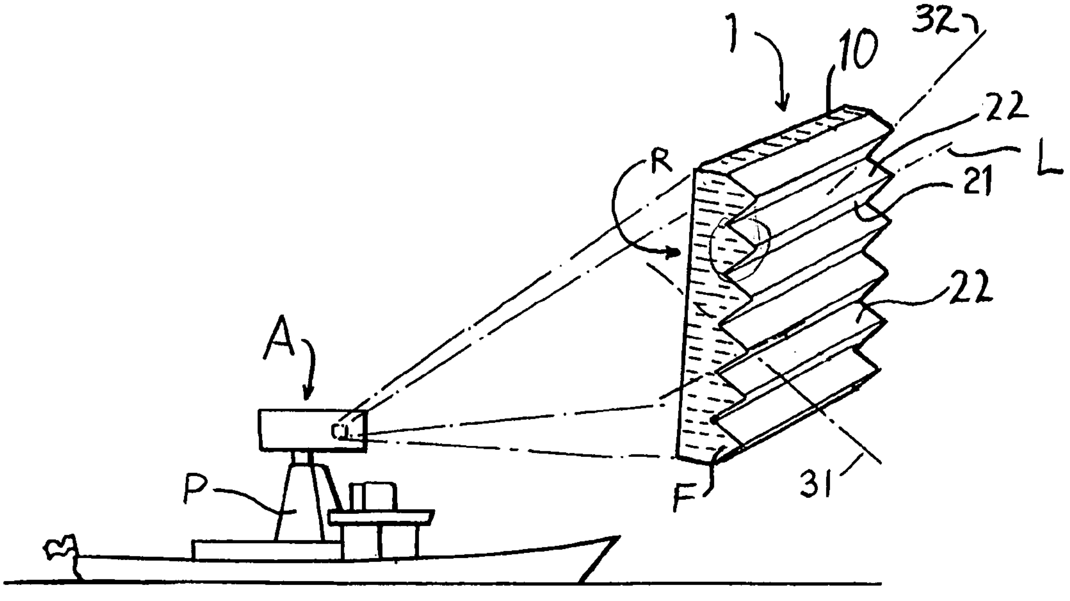
FIG. 1 is a schematic representation of a ship having an antenna as well as a camouflaging device according to the invention arranged thereon, having function elements which, in a first embodiment, is additionally schematically shown in an enlarged representation.
Figure 2:
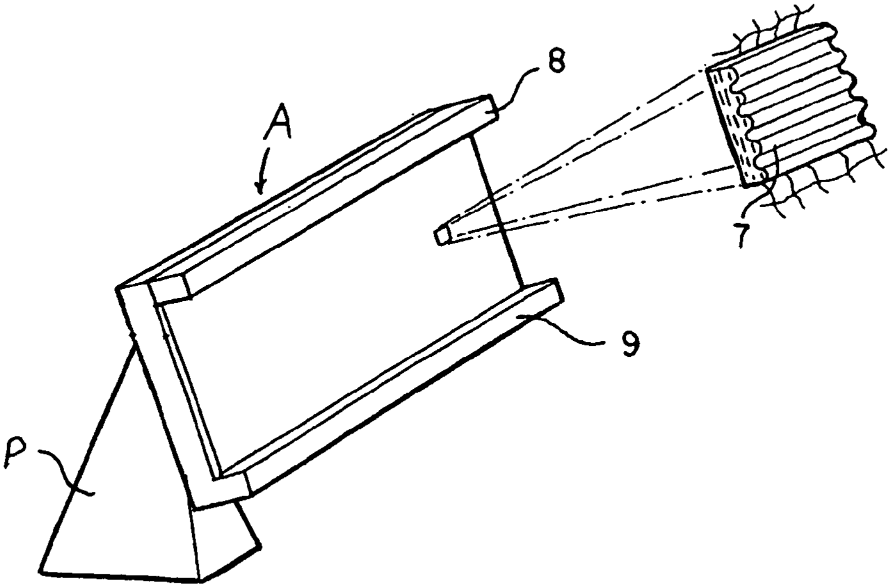
FIG. 2 is another view of an antenna with an alternative embodiment of the function elements.

The camouflaging device according to the invention is used for camouflaging specularly reflecting surfaces. These surfaces may be components of, for example, an antenna, a radar absorber, a building wall or a wall of a vehicle, such as a ship or a land craft. As an example of a use of the invention, FIG. 1 shows an antenna on a ship, which has the camouflaging device according to the invention.

According to one aspect of the camouflaging device 1 according to the invention, reflections, which occur because of the radiation of a radiation source and particularly of the sun on an outer layer 10 facing the radiation source, are compensated for an outside observer or a sensor. For this purpose, the outer layer 10 has function elements F which are arranged side-by-side in the longitudinal direction L.

On its side facing the radiation source, each function element has a pair of individual surfaces 21, 22 which extend side-by-side in the longitudinal direction L and their surfaces extend at an angle with respect to one another. The angular arrangement of the respectively assigned individual surfaces 21, 22 is provided such that the surface normal 31 of a first individual surface 21 is sloped downward (i.e., it points below the horizon) and the surface normal 32 of a second individual surface 22 points steeper than 80° to the horizontal plane. Furthermore, the arrangement of the individual surfaces 21, 22 of a function element of the outer layer 10 is arranged such that their surface courses form an angle of <90° with respect to one another. As a result, it is ensured that the outer layer does not act like a retroreflector. Because of this design, the specular reflex becomes either larger than the altitude of the radiation source (for example, the solar altitude) or lower than the horizon for each position of the radiation source relative to the camouflaging device 1. By this measure, the area of a probable observer or sensor is left free barely above the horizon. However, this does not interfere with the main usage cases of invention. The viewing direction of an assumed observer or sensor close to the rays of a radiation source aimed at the camouflaging device empirically represents a situation of a relatively short duration which is difficult to evaluate.

According to the invention, the camouflaging device 1 is arranged such that the above-mentioned angle definitions with respect to the horizontal plane are observed within a variation range of 5°. This can be ensured by a corresponding holding device P and optionally, in addition, by a positioning device. Here, it can additionally be provided that the longitudinal direction L extends in the horizontal direction or in the direction of the earth's surface existing locally at the position of the antenna, a predefined variation range of preferably 5° being permitted for the course in the horizontal direction. In these cases, an additional functionality may also be connected with the camouflaging device by means of which the alignment of the camouflaging device is ensured such that the longitudinal direction L extends horizontally within predefined limits.

In an embodiment of the invention, the outer layer 10 is formed of a woven tarpaulin and of a knitted structure arranged at least on one side of the woven tarpaulin. When a knitted structure is arranged on only one side of the woven tarpaulin, the knitted structure is arranged on the side of the radiation source.

As an alternative, the outer structure can also be formed of a plastic material, particularly of polypropylene. This has the advantage of a high resistance to corrosion and is relatively easy to produce. It is another advantage that the color of the plastic material can be selected and implemented corresponding to the provided outside conditions.

The partial surfaces 21, 22 preferably have a relatively smooth design.

The partial surfaces 21, 22 have an actual width of between 1 and 10 mm and, in special usage cases, between 2 and 5 mm.

As an alternative, the outer layer 10 on the side of the assumed radiation source may have horizontally extending valleys and elevations of a height of preferably 2 to 4 mm, the width of the valleys being one to two times larger than the depth of the valleys. The horizontal course of the valleys and elevations relates to their longitudinal direction, a fluctuation range of 10° and preferably 5° being accepted. In particular, it is provided in this case that the outer side of the outer layer facing the assumed radiation source is formed of a knitted structure 7 on a base of a spaced woven or a knit.

It is an advantage of a knitted structure that the camouflaging material can be removed for cleaning purposes or is easy to replace in the case of wear. A snap-type blind arrangement is conceivable in this case which, if required, permits the pulling of the woven structure as a camouflaging kit over the entire antenna surface. A variant of this arrangement provides, instead of a blind arrangement, a housing of the woven fabric roll according to the invention in a wind-off and wind-on magazine 8 and 9 respectively. This results in the special advantage that, during the continuous use, the woven tarpaulin can be tensioned and replaced in a simple manner.

A number of demands are made on the material which are met according to the invention by the use of a 100% polypropylene yarn (PP) which is already dyed in the thread and is not further treated. The knitted structure produces a continuous plane on the underside and valleys and elevations in the range of a height of from 2 to 4 mm on the top side. In this case, the width of the valleys is 1-2 times as large as the depth.

When the camouflaging device 1 is used with respect to a radiation source in front of an antenna (that is, when the latter is used as a radome), the electric transmit characteristics of the waves or radiation emitted by the antenna are distorted to a certain degree. This is so although the described design of the outer layer 10 relates to a wavelength range of the radiation of approximately 0.4 to 5.0 μm generated by the radiation source. In order to compensate this radiating distortion, as a continuation of the invention, a structure is provided on the rearward side R of the outer layer 10, that is, on the side of the outer layer 10 facing the antenna A, which structure compensates the distortion of the radar waves generated by the antenna. The compensation is provided at least such that the distortion effect occurring on the side of the outer layer 10 facing the radiation source is compensated by at least 50% and preferably 80% and is ideally neutralized; that is, that the transmit of the rays generated by the antenna remains unchanged.

In the case of a design of the outer layer with angularly arranged individual surfaces 21, 22, for this purpose, the rearward side R of the outer layer 10 may be formed with function elements with a pair of individual surfaces 21, 22 which extend side-by-side in their longitudinal direction L and whose surfaces extend at an angle with respect to one another.

The angular arrangement of the respectively assigned individual surfaces is provided such that the surface normal of a first individual surface 21 is sloped downward (that is, points below the horizon), and the surface normal of a second individual surface 22 points steeper than 80° to the horizontal plane. Furthermore, the arrangement of the individual surfaces 21, 22 of a function element of the outer layer 10 is such that their surface courses form an angle of <90° with respect to one another.

The service life of the camouflaging device 1 can be considerably extended by the same type of design of the rearward side R and the outer side of the outer layer 10, by a removability of the outer layer 10 from the camouflaging device 1 and by corresponding measures of mounting the outer layer 10 in a turned-over manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A camouflage device for camouflaging a specularly reflecting surface of an object, said camouflage device comprising:

- a plurality of function elements for influencing reflection of radiation from a radiation source, which function elements collectively form a continuos outer layer of the camouflage device; wherein,
- each function element has a pair of individual surfaces on its side facing the radiation source;
- said individual surfaces extend side-by-side in a longitudinal direction;
- the camouflage device is arrangeable on the object in front of a reflecting surface of said object that faces said radiation source;
- angular arrangement of the individual surfaces in a pair of said individual surfaces is such that a surface normal of a first one of said individual surfaces in said pair is sloped downward, and a surface normal of a second one of said individual surfaces in said pair is sloped upward at an angle greater than 80° relative to a horizontal plane; and
- surface courses of said first and second surfaces form an angle of <90° with respect to one another.

2. The camouflage device according to claim 1, wherein actual width of the individual surfaces is between 2 and 5 mm.

3. The camouflage device according to claim 1, wherein:

- in an installed state on an antenna, a rearward side of the outer layer, which faces the antenna, has a pair of rearward surfaces that extend side-by-side in their longitudinal direction; and
- said rearward surfaces are arranged at an angle with respect to one another and at least partially compensate distortions of the antenna radiation due to structuring of the outer side of the outer layer.

4. A camouflage device for camouflaging specularly reflecting surfaces of an object, said camouflage device comprising:

- a plurality of function elements for influencing the reflection of an assumed radiation source, which function elements collectively form an uninterrupted outer layer of the camouflage device; wherein,
- each function element has on its outer side facing the radiation source, valleys and elevations with differences of height of between 2 and 4 mm;
- width of the valleys is one to two times larger than the depth of the valleys;
- the camouflage device is arrangeable on the object such that a longitudinal direction of the valleys and elevations extends in a horizontal plane.

5. The device according to claim 4, wherein said outer layer comprises a knitted structure.

6. The device according to claim 4, wherein said camouflage device comprises a blind arrangement having snaps, whereby the camouflage device can be deployed over an entire surface of said object.

7. The device according to claim 4, wherein said camouflage device comprises a housing of a woven fabric roll, in a wind-off and wind-on magazine.

8. The device according to claim 4, wherein the outer side of the function elements comprises a knitted structure on a base of a woven material.

9. The device according to claim 4, wherein the camouflage device comprises a housing with a fabric roll in a wind-on wind-off magazine.

10. The device according to claim 4, wherein the camouflage device comprises a snappable blind arrangement whereby the camouflage device can be applied over an entire surface of the object.

11. A camouflage device for camouflaging a reflective surface of an object, said camouflage device comprising:

- a layer of camouflage material; and
- reflecting means which are integral to said layer of material, for reflecting a portion of light which is directed onto said layer of material in an upward direction and a remaining portion in a downward direction, relative to horizontal; wherein,
- said reflecting means comprises a plurality of parallel contiguous horizontal ridges formed on an outer surface of said layer of material;
- each ridge is formed by a pair of individual horizontally extending surfaces which are disposed at an angle relative to each other;
- angular arrangement of the individual surfaces in a pair of said individual surfaces is such that a surface normal of a first one of said individual surfaces in said pair is sloped downward, and a surface normal of a second one of said individual in said pair is sloped upward; and
- surface courses of said first and second surfaces form an angle of <90° with respect to one another.

* * * * *